(12) United States Patent
Kolouri et al.

(10) Patent No.: US 11,086,299 B2
(45) Date of Patent: Aug. 10, 2021

(54) SYSTEM AND METHOD FOR ESTIMATING UNCERTAINTY OF THE DECISIONS MADE BY A SUPERVISED MACHINE LEARNER

(71) Applicant: HRL Laboratories, LLC, Malibu, CA (US)

(72) Inventors: Soheil Kolouri, Agoura Hills, CA (US); Heiko Hoffmann, Simi Valley, CA (US)

(73) Assignee: HRL Laboratories, LLC, Malibu, CA (US)

( * ) Notice: Subject to any disclaimer, the term of this patent is extended or adjusted under 35 U.S.C. 154(b) by 123 days.

(21) Appl. No.: 16/262,894

(22) Filed: Jan. 30, 2019

(65) Prior Publication Data
US 2019/0294149 A1  Sep. 26, 2019

Related U.S. Application Data

(60) Provisional application No. 62/648,304, filed on Mar. 26, 2018.

(51) Int. Cl.
*G06K 9/00* (2006.01)
*G05B 19/416* (2006.01)
(Continued)

(52) U.S. Cl.
CPC ....... *G05B 19/416* (2013.01); *G06K 9/00664* (2013.01); *G06K 9/00791* (2013.01);
(Continued)

(58) Field of Classification Search
CPC ........ G05B 19/416; G05B 2219/40279; G06K 9/6257; G06K 9/622; G06K 9/00664;
(Continued)

(56) References Cited

U.S. PATENT DOCUMENTS

| 8,649,565 B1 | 2/2014 | Kim et al. |
| 8,793,046 B2 * | 7/2014 | Lombrozo ........... G05D 1/0088 701/23 |

(Continued)

FOREIGN PATENT DOCUMENTS

KR  10-2015-0016381 A  2/2015

OTHER PUBLICATIONS

Notification of Transmittal of International Search Report and the Written Opinion of the International Searching Authority for PCT/US2019/015931; dated May 17, 2019.
(Continued)

*Primary Examiner* — Samir A Ahmed
(74) *Attorney, Agent, or Firm* — Tope-McKay & Associates

(57) ABSTRACT

Described is a system for controlling autonomous platform. Based on an input image, the system generates a motor control command decision for the autonomous platform. A probability of the input image belonging to a set of training images is determined, and a reliability measure for the motor control command decision is generated using the determined probability. An exploratory action is performed when the reliability measure is above a predetermined threshold. Otherwise, an exploitation action corresponding with the motor control command decision is performed when the reliability measure is below a predetermined threshold.

21 Claims, 8 Drawing Sheets

(51) Int. Cl.
  *G06K 9/62* (2006.01)
  *G06N 20/00* (2019.01)
(52) U.S. Cl.
  CPC ........... *G06K 9/622* (2013.01); *G06K 9/6257* (2013.01); *G06K 9/6277* (2013.01); *G06N 20/00* (2019.01); *G05B 2219/40279* (2013.01)
(58) Field of Classification Search
  CPC ............. G06K 9/6277; G06K 9/00791; G06K 9/6262; G06K 9/6273; G06N 20/00; G06N 7/005; G06N 3/0454; G06N 3/084; G06N 3/088; G06N 3/0472; B25J 9/163; B25J 9/1676; B25J 9/1697
  See application file for complete search history.

(56) References Cited

U.S. PATENT DOCUMENTS

| | | | | |
|---|---|---|---|---|
| 2013/0325241 | A1* | 12/2013 | Lombrozo | B60W 30/16 701/23 |
| 2014/0032033 | A1 | 1/2014 | Einecke et al. | |
| 2016/0000511 | A1* | 1/2016 | Hoffmann | B25J 9/1628 606/130 |
| 2017/0083608 | A1* | 3/2017 | Ye | G06N 20/10 |
| 2018/0032082 | A1 | 2/2018 | Shalev-Shwartz et al. | |

OTHER PUBLICATIONS

International Search Report of the International Searching Authority for PCT/US2019/015931; dated May 17, 2019.
Written Opinion of the International Searching Authority for PCT/US2019/015931; dated May 17, 2019.
H. Hoffmann. Unsupervised Learning of Visuomotor Associations, vol. 11 of MPI Series in Biological Cybernetics. Logos Verlag Berlin, 2005, pp. 45 to 49 (Section 3.3.2).
C. Beecks, A. M. Ivanescu, S. Kirchhoff, and T. Seidl. Modeling image similarity by gaussian mixture models and the signature quadratic form distance. In Computer Vision (ICCV), 2011 IEEE International Conference on, pp. 1754-1761. IEEE, 2011.
A. P. Dempster, N. M. Laird, and D. B. Rubin. Maximum likelihood from incomplete data via the EM algorithm. Journal of the Royal Statistical Society. Series B (Methodological), pp. 1-38, 1977.
I. Goodfellow, J. Pouget-Abadie, M. Mirza, B. Xu, D. Warde-Farley, S. Ozair, A. Courville, and Y. Bengio. Generative adversarial nets. In Advances in neural information processing systems, pp. 2672-2680, 2014.
B. Jian and B. C. Vemuri. Robust point set registration using Gaussian Mixture Models. IEEE Transactions on Pattern Analysis and Machine Intelligence, 33(8): pp. 1633-1645, 2011.
C. Jin, Y. Zhang, S. Balakrishnan, M. J. Wainwright, and M. I. Jordan. Local maxima in the likelihood of Gaussian Mixture Models: Structural results and algorithmic consequences. In Advances in Neural Information Processing.Systems, pp. 4116-4124, 2016.
Soheil Kolouri, Gustavo K. Rohde, and Heiko Hoffmann. Sliced Wasserstein Distance for Learning Gaussian Mixture Models. arXiv:1711.05376, 2017, pp. 1-13.
M. E. Tipping and C. M. Bishop. Mixtures of probabilistic principal component analyzers. Neural Computation, 11: pp. 443-482, 1999.
M. Hagan and M. Menhaj. Training feedforward networks with the Marquardt algorithm. IEEE transactions on Neural Networks, 5(6): pp. 989-993, 1994.
Notification of the International Preliminary Report on Patentability Chapter I for PCT/US2019/015931; dated Oct. 8, 2020.
The International Preliminary Report on Patentability Chapter I for PCT/US2019/015931; dated Oct. 8, 2020.

* cited by examiner

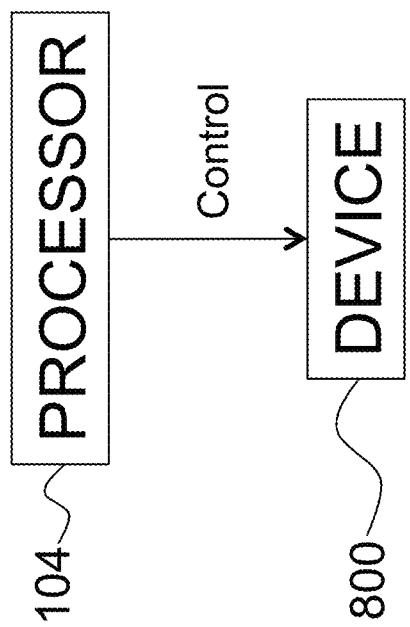

SYSTEM AND METHOD FOR ESTIMATING UNCERTAINTY OF THE DECISIONS MADE BY A SUPERVISED MACHINE LEARNER

CROSS-REFERENCE TO RELATED APPLICATIONS

This is a Non-Provisional Application of U.S. Provisional Application No. 62/648,304, filed in the United States on Mar. 26, 2018, entitled, "System and Method for Estimating Uncertainty of the Decisions Made by a Supervised Machine Learner," the entirety of which is incorporated herein by reference.

BACKGROUND OF INVENTION

(1) Field of Invention

The present invention relates to a system for estimating the uncertainty of decisions made by a supervised machine learner and, more particularly, to a system for estimating the reliability of control outputs of an autonomous platform.

(2) Description of Related Art

Existing methods for mapping input data onto decisions use deep neural networks. A disadvantage of these methods is that they do not provide a confidence measure for how well new data matches the training set. A deep neural network may provide a high confidence decision for a novel data point that is far away from the distribution of training data, but a data point outside the training distribution will result in an unreliable decision.

The prior art for estimating data distributions are Gaussian mixture models (GMM) (see the List of Incorporated Literature References, Literature References Nos. 1 and 8), which are probability density functions describing the data. The existing methods to estimate the GMM parameters are based on minimizing the negative log-likelihood (NLL) of the data with respect to the parameters (see Literature Reference No. 8). The Expectation Maximization (EM) algorithm (see Literature Reference No. 2) is the prominent way of minimizing the NLL. However, it guarantees convergence to only a stationary point of the likelihood function and may not find the global optimum.

Various studies have shown that the likelihood function has bad local maxima that can have arbitrarily worse log-likelihood values compared to any of the global maxima (see Literature Reference Nos. 4 and 6). Moreover, Jian et al. (see Literature Reference No. 5) proved that with random initialization, the EM algorithm will converge to a bad critical point with high probability. This issue turns the EM algorithm sensitive to the choice of initial parameters.

Current generative adversarial network (GAN) (see Literature Reference No. 3) methods receive a known distribution (e.g., a multivariate Gaussian distribution) and map it to the image distribution (i.e., generate synthetic images). Therefore, current GANs do not focus on clustering the data distribution. In addition, given that the input data distribution (i.e., the multivariate Gaussian) is an extremely poor approximation of typical real-world data distributions, GANs have a hard time generating good data points that are representative of a training set.

Thus, a continuing need exists for a system to improve uncertainty estimates of machine learning systems to enable better targeted learning for which a machine learning system provides poor results.

SUMMARY OF INVENTION

The present invention relates to a system for estimating the uncertainty of decisions made by a supervised machine learner and, more particularly, to a system for estimating the reliability of control outputs of an autonomous platform. The system comprises one or more processors and a non-transitory computer-readable medium having executable instructions encoded thereon such that when executed, the one or more processors perform multiple operations. For an input image, the system generates a motor control command decision for the autonomous platform. A probability of the input image belonging to a set of training images is determined. A reliability measure for the motor control command decision is generated using the determined probability. If the reliability measure is above a predetermined threshold, then the system causes the autonomous platform to perform an exploratory action. If the reliability measure is below a predetermined threshold, then the system causes the autonomous platform to perform an exploitation action corresponding with the motor control command decision.

In another aspect, in determining the probability of the input image belonging to the seen class of images, the system learns an embedding for a distribution of the input data.

In another aspect, in learning the embedding for the distribution of the input data, a Sliced Wasserstein clustering technique is used.

In another aspect, in performing the exploratory action, the autonomous platform collects additional input data in a region of an environment surrounding the autonomous platform.

In another aspect, in performing the exploitation action, the autonomous platform executes motor control commands that lead to a pre-specified goal.

In another aspect, a decision module is trained with the set of training images via supervised learning or reinforcement learning, wherein the decision module generates the motor control command decision. An uncertainty module is trained with the set of training images in an unsupervised manner, wherein the uncertainty module determines the probability of the input image belonging to the set of training images. The uncertainty module is trained in parallel with the decision module.

In another aspect, in determining a probability of the input image belonging to the set of training images, the system embeds the input image into a lower dimensional Hilbert space using an adversarial convolutional auto-encoder, and a distribution of the input data in the lower dimensional Hilbert space is modeled via Gaussian mixture models.

In another aspect, the autonomous platform comprises a robotic arm, and the exploratory action is trying new ways of grasping an object with the robotic arm.

In another aspect, the autonomous platform comprises a robotic arm, and the exploitation action is a known action that includes grasping and handling an object with the robotic arm.

In another aspect, the autonomous platform is a vehicle, and the exploitation action is avoiding a collision.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where:

FIG. 8 conceptually illustrates a process for controlling devices using a reliability measures result according to some embodiments of the present disclosure.

DETAILED DESCRIPTION

Figure 1:
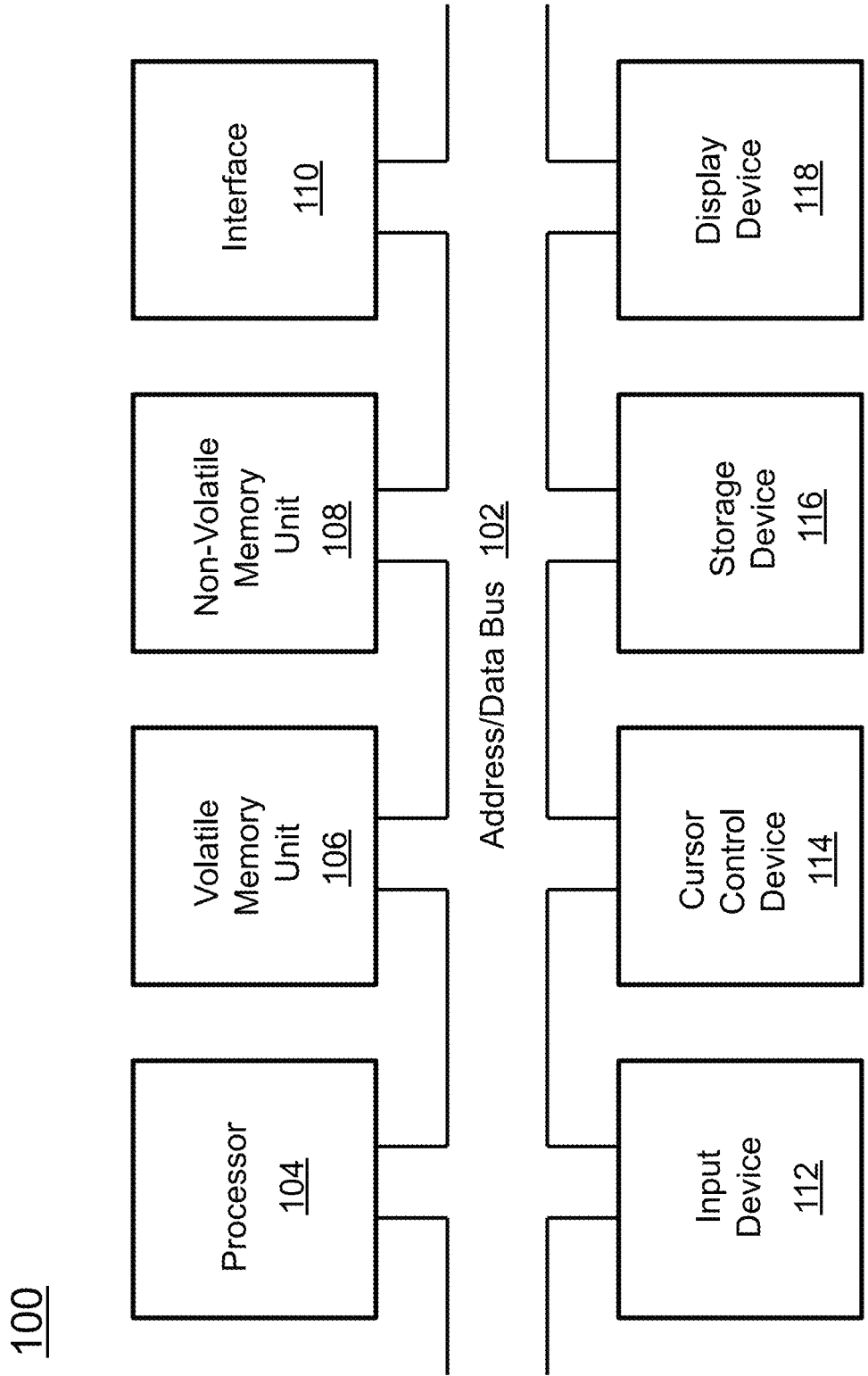
FIG. 1 is a block diagram depicting the components of a system for estimating the uncertainty of decisions made by a supervised machine learner according to some embodiments of the present disclosure.

The present invention relates to a system for estimating the uncertainty of decisions made by a supervised machine learner and, more particularly, to a system for estimating the reliability of control outputs of an autonomous platform. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Finally, specific details of various embodiment of the present invention are provided to give an understanding of the specific aspects.

(1) LIST OF INCORPORATED LITERATURE REFERENCES

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number, as follows:

1. C. Beecks, A. M. Ivanescu, S. Kirchhoff, and T. Seidl. Modeling image similarity by gaussian mixture models and the signature quadratic form distance. In Computer Vision (ICCV), 2011 IEEE International Conference On, pages 1754-1761. IEEE, 2011.
2. A. P. Dempster, N. M. Laird, and D. B. Rubin. Maximum likelihood from incomplete data via the EM algorithm. Journal of the Royal Statistical Society. Series B (Methodological), pages 1-38, 1977.
3. I. Goodfellow, J. Pouget-Abadie, M. Mirza, B. Xu, D. Warde-Farley, S. Ozair, A. Courville, and Y. Bengio. Generative adversarial nets. In Advances in neural information processing systems, pages 2672-2680, 2014.
4. H. Hoffmann. Unsupervised Learning of Visuomotor Associations, volume 11 of MPI Series in Biological Cybernetics. Logos Verlag Berlin, 2005.
5. B. Jian and B. C. Vemuri. Robust point set registration using Gaussian Mixture Models. IEEE Transactions on Pattern Analysis and Machine Intelligence, 33(8):1633-1645, 2011.
6. C. Jin, Y. Zhang, S. Balakrishnan, M. J. Wainwright, and M. I. Jordan. Local maxima in the likelihood of Gaussian Mixture Models: Structural results and algorithmic consequences. In Advances in Neural Information Processing Systems, 4116-4124, 2016.
7. Soheil Kolouri, Gustavo K. Rohde, and Heiko Hoffmann. Sliced Wasserstein Distance for Learning Gaussian Mixture Models. arXiv:1711.05376, 2017.
8. M. E. Tipping and C. M. Bishop. Mixtures of probabilistic principal component analyzers. Neural Computation, 11:443-482, 1999.
9. M. Hagan and M. Menhaj. Training feedforward networks with the Marquardt algorithm. IEEE transactions on Neural Networks, 5(6): 989-93, 1994.

(2) PRINCIPAL ASPECTS

Various embodiments of the invention include three "principal" aspects. The first is a system for estimating uncertainty of decisions made by a supervised machine learner. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic, solid state, or optical disk drive (e.g., hard disk drive ("HDD"), floppy diskette, compact disc read only memory ("CD-ROM"), digital versatile disk ("DVD"), and/or removable flash memory). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
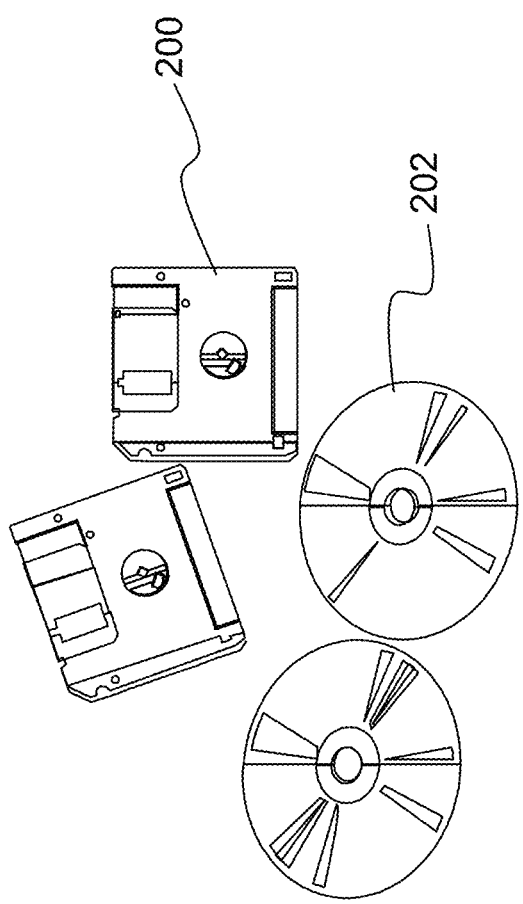
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the present invention is not limited to the computer program products illustrated in FIG. 2. One with ordinary skill in the art will appreciate that any suitable computer program product may be used without departing from the scope of the present disclosure and the computer program product depicted in FIG. 2 generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(2) SPECIFIC DETAILS OF VARIOUS EMBODIMENTS

Described is a system and method for controlling the exploratory behavior of a mobile robot or robot arm. The behavior is controlled by switching between an exploration and an exploitation mode. To decide when to switch, the system estimates the uncertainties of the decisions made by a machine learning model, which learns from the explorations of the robot and computes control commands. The system according to embodiments of the present disclosure consists of two general modules, namely the decision module (i.e., the learner) and the uncertainty module.

The decision module is a machine learner that is trained in a supervised manner or using reinforcement learning. For instance, the decision module could be a convolutional neural network (CNN), which receives as input electro-optical (EO) camera data and outputs motor control commands. During the training phase, both modules are trained in parallel, receiving the same input data.

On a high-level, motor control commands are movement comments, such as "move the robot end-effector 10 centimeters to the right", or "turn the robot mobile platform by 50 degrees". At a lower level, the motor control commands are torques at joints or wheel velocities. It is known by someone trained in the art how to convert the above high-level motor commands into low-level commands. The specifications depend on the particular autonomous platform (e.g., robot, vehicle). A non-limiting example for using a motor command is the following. An autonomous car tries to determine if the object in front of it on the street is an obstacle that needs to be avoided. The method described herein provides a probability of the system correctly identifying the object as an obstacle. If the system is uncertain about the obstacle detection or detects an obstacle, a movement is planned that guides the car around the obstacle. It is known in the prior art how to plan a trajectory that guides a car around an obstacle. This trajectory is then converted into motor commands, such as the steering angle. Computing such motor commands based on a trajectory is known by one skilled in art.

The uncertainty module is an adversarial neural auto-encoder, which learns a low-dimensional embedding for the distribution of the input data in an unsupervised manner alongside the decision module. Finally, the uncertainty module uses a unique clustering technique, referred to as sliced p-Wasserstein learning of Gaussian mixture models (GMM), to learn a probabilistic model for the embedded distribution of the input data (see Literature Reference No. 7). In the testing phase, for an input test image, the decision module provides a decision vector, while the uncertainty module calculates the probability of the input data belonging to the seen classes of images (e.g., faces, vehicles, body parts), providing an uncertainty level for the output of the decision module. An image class is a collection of images sharing similar attributes/features, such as the same object or scene. For input data resulting in high uncertainty, the system described herein switches from exploitation to exploration of the robot.

The invention described herein improves uncertainty estimates of machine learning (ML) systems to enable better targeted learning on data for which the ML system provides poor results. The uncertainty estimates could, for example, relate to the control outputs of an autonomous vehicle that has to stop when recognizing an obstacle in front. Today, many applications (e.g., military) prohibit the use of ML systems because the made decisions do not contain a meaningful measure of uncertainty. By complementing the decision module with an uncertainty module, which provides a probabilistic representation of the input distribution of the data, a meaningful measure of uncertainty for the decision module is provided.

The uncertainty module benefits from the unique probabilistic clustering framework (see Literature Reference No. 7) that has advantages over prior art. For instance, it is robust to initialization and provides consistent clustering, provides higher clustering fidelity, and is capable of generative sampling of learned clusters. The system enables estimation of the distribution of training data probabilistically and can provide a measure for the likelihood that a new data point originates from a distribution comparable to the training set. Each of these aspects will be described in detail below.

Figure 3B:
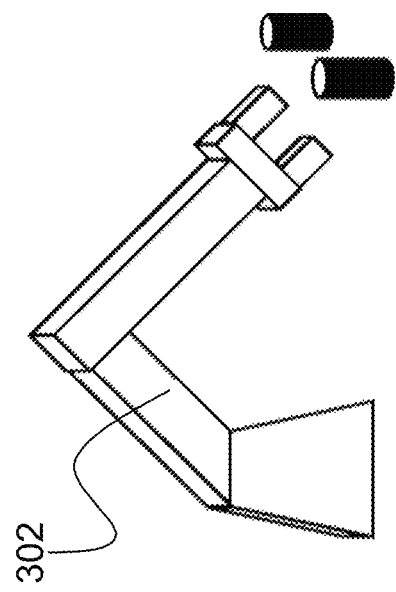
FIG. 3B is an illustration of a robot arm exploring its environment according to some embodiments of the present disclosure.
Figure 3A:
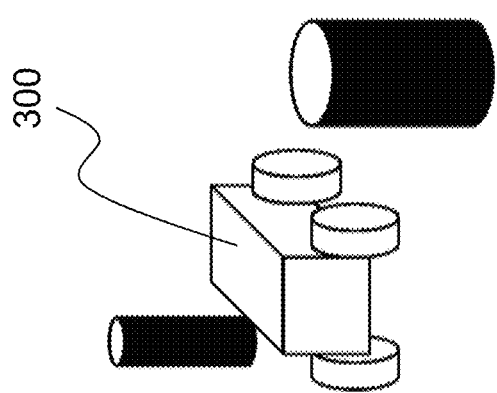
FIG. 3A is an illustration of a mobile robot exploring its environment according to some embodiments of the present disclosure.

The system described herein can be used to control the exploratory behavior of an autonomous machine or robot, as shown in FIGS. 3A and 3B. Specifically, FIG. 3A is an illustration of a mobile robot 300 exploring its environment, and FIG. 3B illustrates a robot arm 302 exploring its environment. The challenge is to direct the learning towards input data for which a machine learning system still produces output with high uncertainty. Thus, there is a need for a system that provides good estimates of this uncertainty. Such a system could be part of a control system of an autonomous platform, such as a robot or autonomous vehicle (e.g., self-driving car). As a non-limiting example, the machine learning system maps a visual input onto an obstacle-avoidance decision.

Given new data, the system according to embodiments of the present disclosure computes a reliability measure of this decision. Based on this measure, the autonomous platform switches either between exploration (if the uncertainty is above a threshold) or exploitation (if the uncertainty is below a threshold). Exploration (depicted in FIGS. 3A and 3B) implies that the autonomous platform or robot has to collect more training data in the region of the environment that resembles the input data that is responsible for the high uncertainty. During the exploration phase a robotic arm, for example, tries new ways of grasping an object that has not been included in the training set (e.g., a new type of door handle). Similarly, an autonomous platform may try new maneuvers (e.g., turns, stops, accelerations) in the exploration phase. Exploitation means that the autonomous platform or robot can execute control commands that lead to a pre-specified goal. In the exploitation phase, the autonomous platform or robot, relies on the known actions (e.g., learned ways of grasping an object, learned maneuvers) that are learned during their training. The goal for a robotic arm, for instance, could be to successfully grab and handle an object. For an autonomous platform, the goal could be avoiding collision while traveling the shortest distance.

Figure 4:
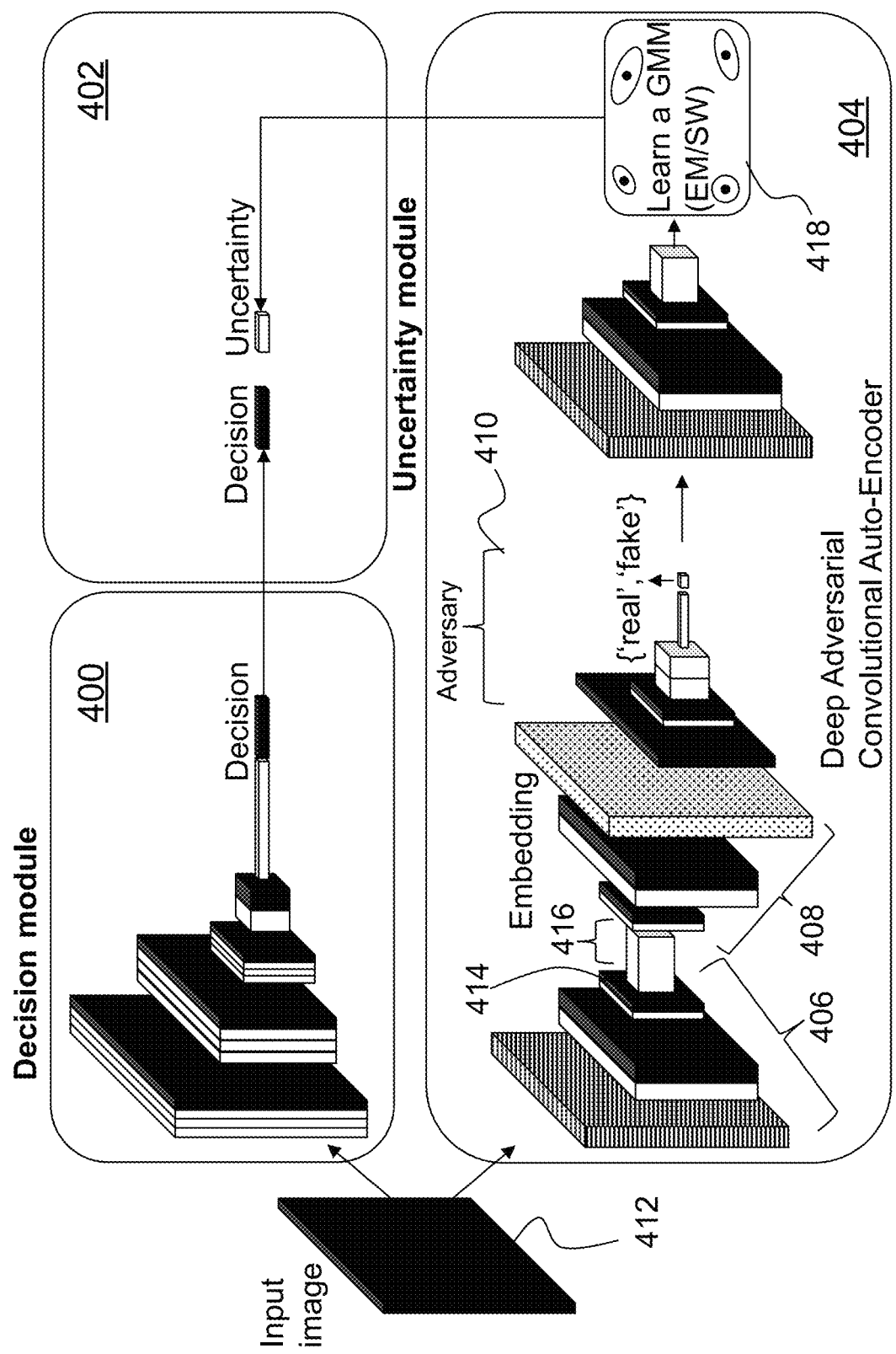
FIG. 4 is an illustration of a system for estimating uncertainty of decisions made by a supervised machine learner according to some embodiments of the present disclosure.

The system described herein contains a decision module 400 and an uncertainty module 402, which run in parallel as shown in FIG. 4. The decision module 400 is trained via supervised learning or reinforcement learning, while the uncertainty module 402 models the distribution of the seen data in an unsupervised manner.

(3.1) Decision Module 400

The decision module 400 consists of a deep neural network that is trained for decision making during the training phase in a supervised manner. Backpropagation (described in Literature Reference No. 9) is used to optimize the parameters of such a neural network for decision making. The performance of the decision module 400 increases over the term of training. However, the trained network is only guaranteed to perform well if the test data follows the distribution of the training data. Unfortunately, current neural networks cannot distinguish if an input image is close to or far away from what they have seen in the training. Therefore, they often generate a decision with high-confidence even for outliers and unseen images. To avoid such false confidence, the decision module 400 according to embodiments of the present disclosure is accompanied with an uncertainty module 402.

(3.2) Uncertainty Module 402

The uncertainty module 402 receives as input the same training data as the decision module 400. The goal of the uncertainty module 402 is, however, to learn the distribution of the input data. To learn such a distribution, the combination of a deep adversarial convolutional auto-encoder 404 is used together with a unique Sliced Wasserstein Clustering technique (see Literature Reference No. 7). The auto-encoder 404 is an artificial neural network having multiple layers, typically an input layer, a code layer, and an output layer (represented by various sized rectangular shapes). The auto-encoder 404 learns to compress data from the input layer into a short code and then uncompress that code into something that closely matches the original data for dimensionality reduction.

The adversarial neural auto-encoder 404 consists of three neural network modules, namely: 1) a deep convolutional encoder 406, 2) a deep convolutional decoder 408, and 3) a deep convolutional classifier 410 (i.e., the adversary network). These modules consist of multiple layers of convolutional artificial neurons. The input to the encoder is the image 412 and it activates various artificial neurons in the encoder at multiple layers. The output of the encoder 406 is the neural activations of the artificial neurons at the final layer 414 of the encoder 406, which provides a d-dimensional vector. The output vector is an embedded representation 416 of the input image 412 in a d-dimensional Hilbert space.

The decoder 408 also consists of multiple layers of convolutional artificial neurons. The input to the decoder 408 is the d-dimensional output of the encoder 406. The d-dimensional input to the decoder (i.e., the embedded representation 416 of the input image 412 to the encoder 406) activates various neurons at different layers of the decoder 408, while the final neurons of the decoder 408 form an image (see decoded image 500 in FIG. 5).

The adversary network (deep convolutional classifier 410) also consists of multiple layers of convolutional artificial neurons. The adversary network receives an image 412 as input and it outputs the probability of the input image 412 being a 'real' image or a 'fake' image. In short, the adversarial neural auto-encoder 404 embeds the images 412 into a lower dimensional Hilbert space (e.g., 256-dimensional). "Lower dimensional" refers to lower than the dimensionality of the input to the system. For instance, the input could be a 256×256×3 RGB image, which is a 196,608-dimensional space, while the embedding is a 256-dimensional space, which is much less than 196,608.

It captures the nonlinearity of the image data and boosts the applicability of GMMs 418. For a given image dataset, the system parts are optimized simultaneously so that the composition of the encoder 406 and decoder 408 is close to the identity function (i.e., the reconstructed image by the decoder 408 is similar to the input image 412 to the encoder 406) and, also, the adversarial network (deep convolutional classifier 410) cannot distinguish a decoded image from an original image (i.e., when the output of the decoder 408 is fed to the deep convolutional classifier 410, it returns 'real' with high probability).

Figure 5:
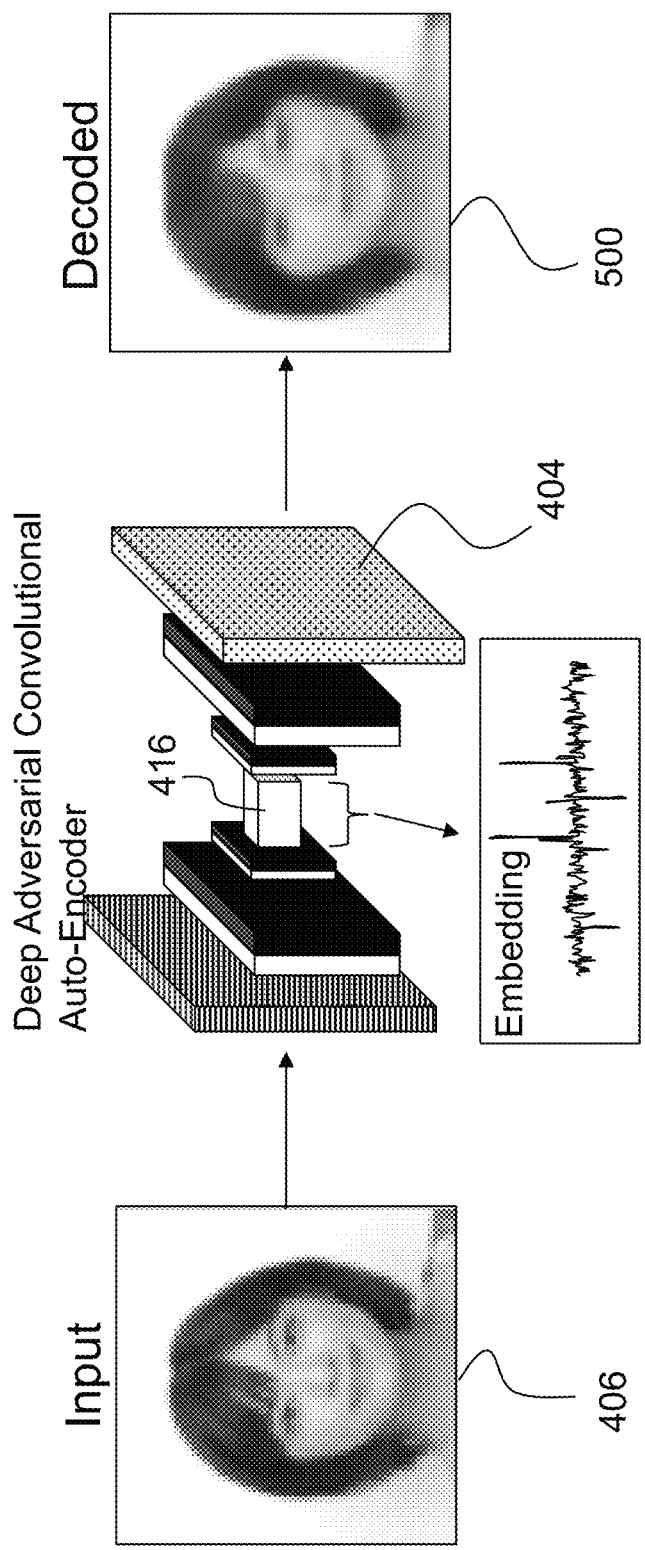
FIG. 5 is an illustration of an autoencoder and sample results after processing an image with the autoencoder according to some embodiments of the present disclosure.

The deep adversarial convolutional autoencoder 404 may be trained on any suitable dataset of image attributes, such as the CelebA face. FIG. 5 illustrates an exemplary sample result of the autoencoder 404 on the CelebA dataset. However, as noted above, any suitable type of dataset may be utilized without departing from the scope of the present disclosure. Note that, the adversarial network portion of the auto-encoder 404 constrains the output (i.e., decoded image 500) to mimic that of the real input images 406, hence, it indirectly enforces the distribution of the embedded images (element 500) to follow that of the original data (element 406).

Figure 6:
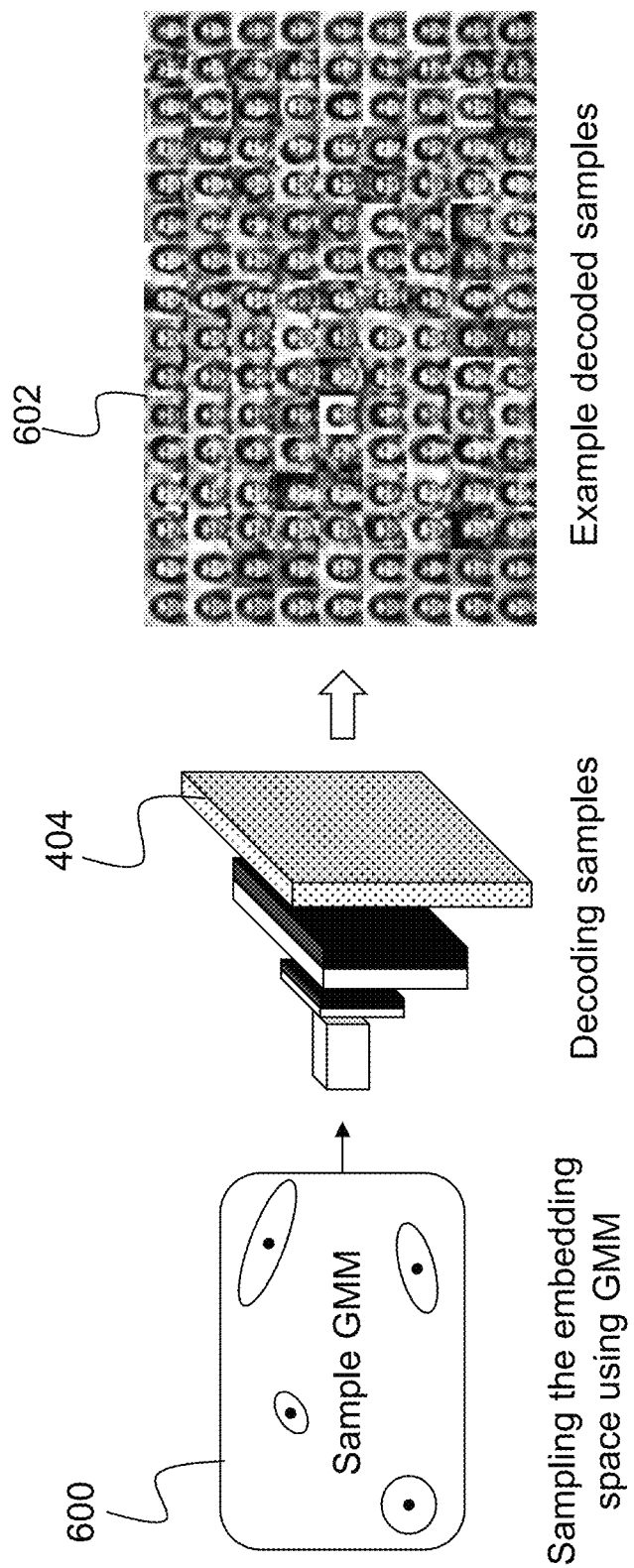
FIG. 6 is an exemplary illustration of synthetically generated images by sampling Gaussian Mixture Model (GMM) modes according to some embodiments of the present disclosure.

Probabilistic clustering based on the sliced-Wasserstein learning of the GMMs (see Literature Reference No. 7) is utilized to model the distribution of the data in the embedding space. As depicted in FIG. 6, to demonstrate that the probabilistic framework according to embodiments of the present disclosure captures the distribution of the data, the learned GMM is sampled (i.e., sampling the embedding space using GMM 600), and the samples are fed to the decoder part of the auto-encoder 404 to visualize the synthetically generated images (i.e., example decoded samples 602). FIG. 6 depicts an exemplary embodiment of synthetically generated images (i.e., example decoded samples 602) by sampling a plurality of learned clusters (i.e., GMM modes). In an exemplary embodiment, the networks may be trained on a face dataset. As can be seen in FIG. 6, the decoded images 602 for randomly sampled vectors in the embedding space correspond to synthetic face images that are visually similar to real faces. This indicates that the method described herein is successful in learning the distribution of the seen classes of images. The clustering scheme gives the likelihood of a sample to be a member of the seen clusters of images. This likelihood is then used in the testing phase to measure the uncertainty of a decision.

(3.3) Testing Phase

In the testing phase for a new input image (or other input data), the decision network (or decision module) generates a control output (e.g., steer to avoid an obstacle). In the uncertainty module 402, the test input 406 is embedded in the low-dimensional Hilbert space via the convolutional auto-encoder 404, and its likelihood of being sampled from trained image classes is calculated given the already learned GMM. Based on this likelihood, a robot (or other autonomous platform) may decide to do more exploration or continue exploitation with various control outputs (e.g., proceed with obstacle avoidance).

Figure 7:
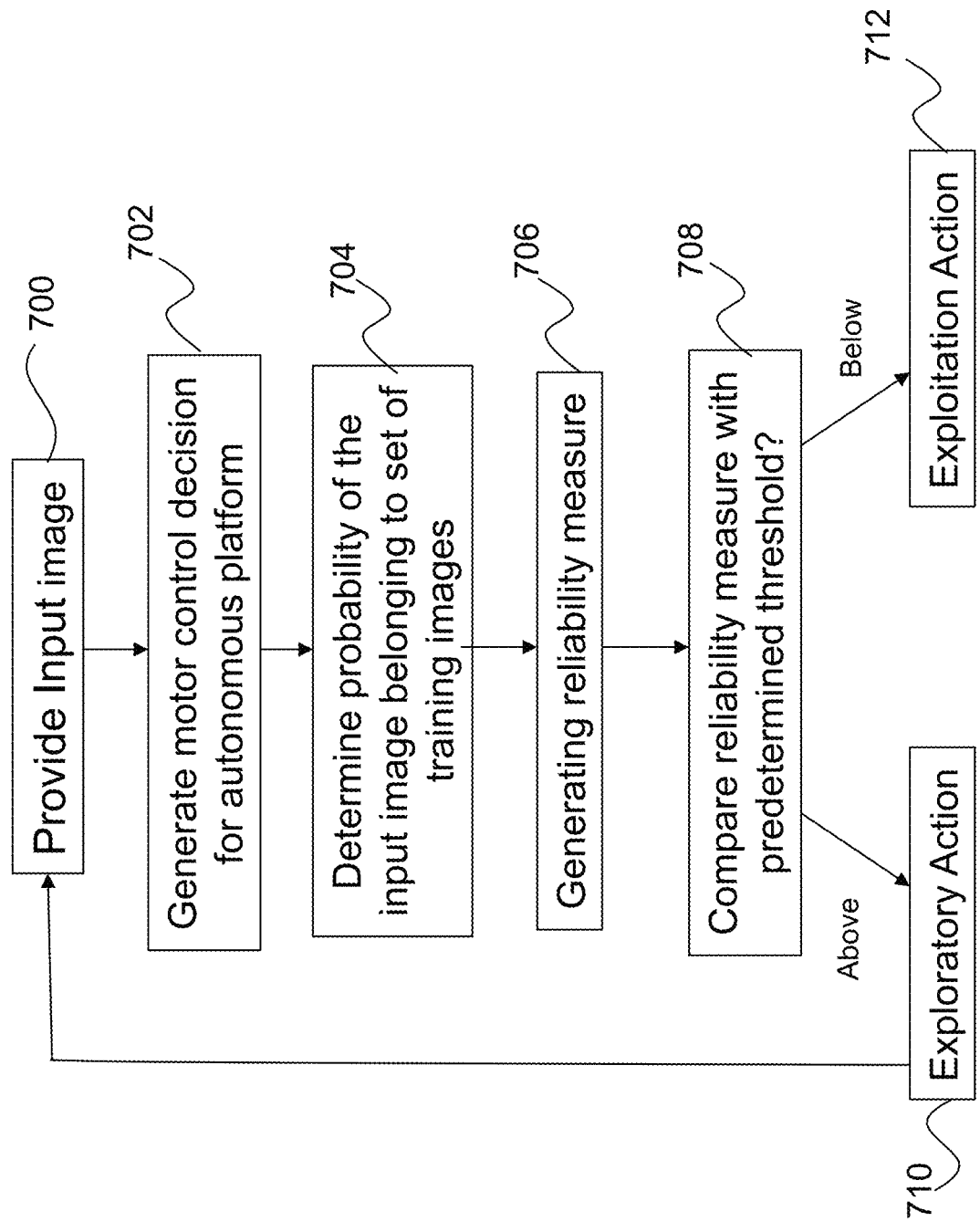
FIG. 7 conceptually illustrates a process for estimating the reliability of control outputs of an autonomous platform.

FIG. 7 is an exemplary process depicting estimation of the reliability of control outputs of an autonomous platform. Given an input image 700, a motor control command decision is generated for the autonomous platform (at 702) by the decision module. A probability of the input image belonging to a set of training images is then determined (at 704) by the uncertainty module. A reliability measure is generated for the motor control command decision using the determined probability (at 706). The system then compares the reliability measure with a predetermined threshold (at 708). If the reliability measure is above a predetermined threshold, then the autonomous platform performs an exploratory action (at 710), where additional input image(s) 700 is/are obtained. If the reliability measure is below a predetermined threshold, then the autonomous platform performs an exploitation action corresponding with the motor control command decision (at 712).

In many applications of interest, a trained machine learning technique is deployed in an autonomous system in order to assess the confidence of the system in making its decision. The technique described herein provides the likelihood for an input image (or other data) to be coming from the training-set distribution and gives a confidence of new data fitting the data distribution. Trustworthy machine learning systems are a key requirement for autonomous driving. Particularly, the processing of camera data is essential in any autonomous driving system. Moreover, trustworthy machine learning systems for object detection in an image are of key interest for military applications, which include autonomous drones. In addition, the present disclosure may also be applicable to camera surveillance techniques.

FIG. 8 is a flow diagram illustrating using a processor 104 to control a device 800 using the uncertainty estimate for the output decision of the decision module. Non-limiting examples of devices 800 that can be controlled via the processor 104 include an autonomous platform (robot, component of robot), motor vehicle, and a motor vehicle component, such as a brake, a steering mechanism, suspension, or safety device (e.g., airbags, seatbelt tensioners, etc.). Further, the autonomous platform could be an unmanned aerial vehicle (UAV) or an autonomous ground vehicle. For instance, upon obtaining an uncertainty estimate value below a predetermined threshold, the system can cause the autonomous vehicle to perform a driving operation/maneuver (such as steering or another command) in line with driving parameters in accordance with the input image. For example, if an object is detected in a path of the autonomous vehicle, the system can cause the autonomous vehicle to apply a functional response, such as a braking operation followed by a steering operation, to redirect vehicle along an alternative route.

Prior art methods are sensitive to the choice of initial parameters. In contrast to this prior art, the system described herein is insensitive to the choice of initial parameters and finds global optima more reliably. By utilizing an adversarial convolutional auto-encoder and modeling the distribution of the data in the embedding space via GMMs, the shortcomings of generative adversarial networks (GANs) are avoided, which is an improvement over existing systems.

Robust unsupervised clustering of the input distribution of the data to estimate uncertainty of the test input, as set forth herein, has not been done before. Moreover, a method for such probabilistic clustering is not obvious either because the input data is often high-dimensional, and it is difficult to make the clustering insensitive to the initial conditions.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for controlling an autonomous platform, the system comprising:
one or more processors and a non-transitory computer-readable medium having executable instructions encoded thereon such that when executed, the one or more processors perform operations of:
generating a motor control command decision for the autonomous platform based on an input image;
determining a probability of the input image belonging to a set of training images;
training a decision module with the set of training images via supervised learning or reinforcement learning, wherein the decision module generates the motor control command decision;
training an uncertainty module with the set of training images in an unsupervised manner, wherein the uncertainty module determines the probability of the input image belonging to the set of training images, wherein the uncertainty module is trained in parallel with the decision module;
generating a reliability measure for the motor control command decision using the determined probability; and
performing an exploratory action when the reliability measure is above a predetermined threshold; otherwise
performing an exploitation action corresponding with the motor control command decision when the reliability measure is below a predetermined threshold.

2. The system as set forth in claim 1, where in determining the probability of the input image belonging to the set of training images, the one or more processors further perform an operation of learning an embedding for a distribution of the input image.

3. The system as set forth in claim 2, where in learning the embedding for the distribution of the input image, a Sliced Wasserstein clustering technique is used.

4. The system as set forth in claim 1, where in performing the exploratory action, the autonomous platform collects additional input data in a region of an environment surrounding the autonomous platform.

5. The system as set forth in claim 1, where in performing the exploitation action, the autonomous platform executes motor control commands that lead to a pre-specified goal.

6. The system as set forth in claim 1, where in determining the probability of the input image belonging to the set of training images, the one or more processors further perform operations of:
embedding the input image into a lower dimensional Hilbert space using an adversarial convolutional autoencoder; and
modeling a distribution of the input image in the lower dimensional Hilbert space via Gaussian mixture models.

7. A computer implemented method for controlling an autonomous platform, the method comprising an act of:
causing one or more processors to execute instructions encoded on a non-transitory computer-readable medium, such that upon execution, the one or more processors perform operations of:
generating a motor control command decision for the autonomous platform based on an input image;
determining a probability of the input image belonging to a set of training images;
training a decision module with the set of training images via supervised learning or reinforcement learning, wherein the decision module generates the motor control command decision;
training an uncertainty module with the set of training images in an unsupervised manner, wherein the uncertainty module determines the probability of the input image belonging to the set of training images,
wherein the uncertainty module is trained in parallel with the decision module;
generating a reliability measure for the motor control command decision using the determined probability; and
performing an exploratory action when the reliability measure is above a predetermined threshold; otherwise
performing an exploitation action corresponding with the motor control command decision when the reliability measure is below a predetermined threshold.

8. The method as set forth in claim 7, where in determining the probability of the input image belonging to the set of training images, the one or more processors further perform an operation of learning an embedding for a distribution of the input image.

9. The method as set forth in claim 8, where in learning the embedding for the distribution of the input image, a Sliced Wasserstein clustering technique is used.

10. The method as set forth in claim 7, where in performing the exploratory action, the autonomous platform collects additional input data in a region of an environment surrounding the autonomous platform.

11. The method as set forth in claim 7, where in performing the exploitation action, the autonomous platform executes motor control commands that lead to a pre-specified goal.

12. The method as set forth in claim 7, where in determining the probability of the input image belonging to the set of training images, the one or more processors further perform operations of:
embedding the input image into a lower dimensional Hilbert space using an adversarial convolutional autoencoder; and
modeling a distribution of the input image in the lower dimensional Hilbert space via Gaussian mixture models.

13. A computer program product for controlling an autonomous platform, the computer program product comprising:
computer-readable instructions stored on a non-transitory computer-readable medium that are executable by a computer having one or more processors for causing the processor to perform operations of:
generating a motor control command decision for the autonomous platform based on an input image;
determining a probability of the input image belonging to a set of training images;
training a decision module with the set of training images via supervised learning or reinforcement learning, wherein the decision module generates the motor control command decision;
training an uncertainty module with the set of training images in an unsupervised manner, wherein the uncertainty module determines the probability of the input image belonging to the set of training images,
wherein the uncertainty module is trained in parallel with the decision module;
generating a reliability measure for the motor control command decision using the determined probability; and
performing an exploratory action when the reliability measure is above a predetermined threshold; otherwise
performing an exploitation action corresponding with the motor control command decision when the reliability measure is below a predetermined threshold.

14. The computer program product as set forth in claim 13, where in determining the probability of the input image belonging to the set of training images, the one or more processors further perform an operation of learning an embedding for a distribution of the input image.

15. The computer program product as set forth in claim 14, where in learning the embedding for the distribution of the input image, a Sliced Wasserstein clustering technique is used.

16. The computer program product as set forth in claim 13, where in performing the exploratory action, the autonomous platform collects additional input data in a region of an environment surrounding the autonomous platform.

17. The computer program product as set forth in claim 13, where in performing the exploitation action, the autonomous platform executes motor control commands that lead to a pre-specified goal.

18. The computer program product as set forth in claim 13, where in determining the probability of the input image belonging to the set of training images, the one or more processors further perform operations of:
embedding the input image into a lower dimensional Hilbert space using an adversarial convolutional autoencoder; and
modeling a distribution of the input image in the lower dimensional Hilbert space via Gaussian mixture models.

19. The system as set forth in claim 1, wherein the autonomous platform comprises a robotic arm, and wherein the exploratory action is trying new ways of grasping an object with the robotic arm.

20. The system as set forth in claim 1, wherein the autonomous platform comprises a robotic arm, and wherein the exploitation action is a known action that includes grasping and handling an object with the robotic arm.

21. The system as set forth in claim 1, wherein the autonomous platform is a vehicle, and wherein the exploitation action is avoiding a collision.

* * * * *